UNITED STATES PATENT OFFICE.

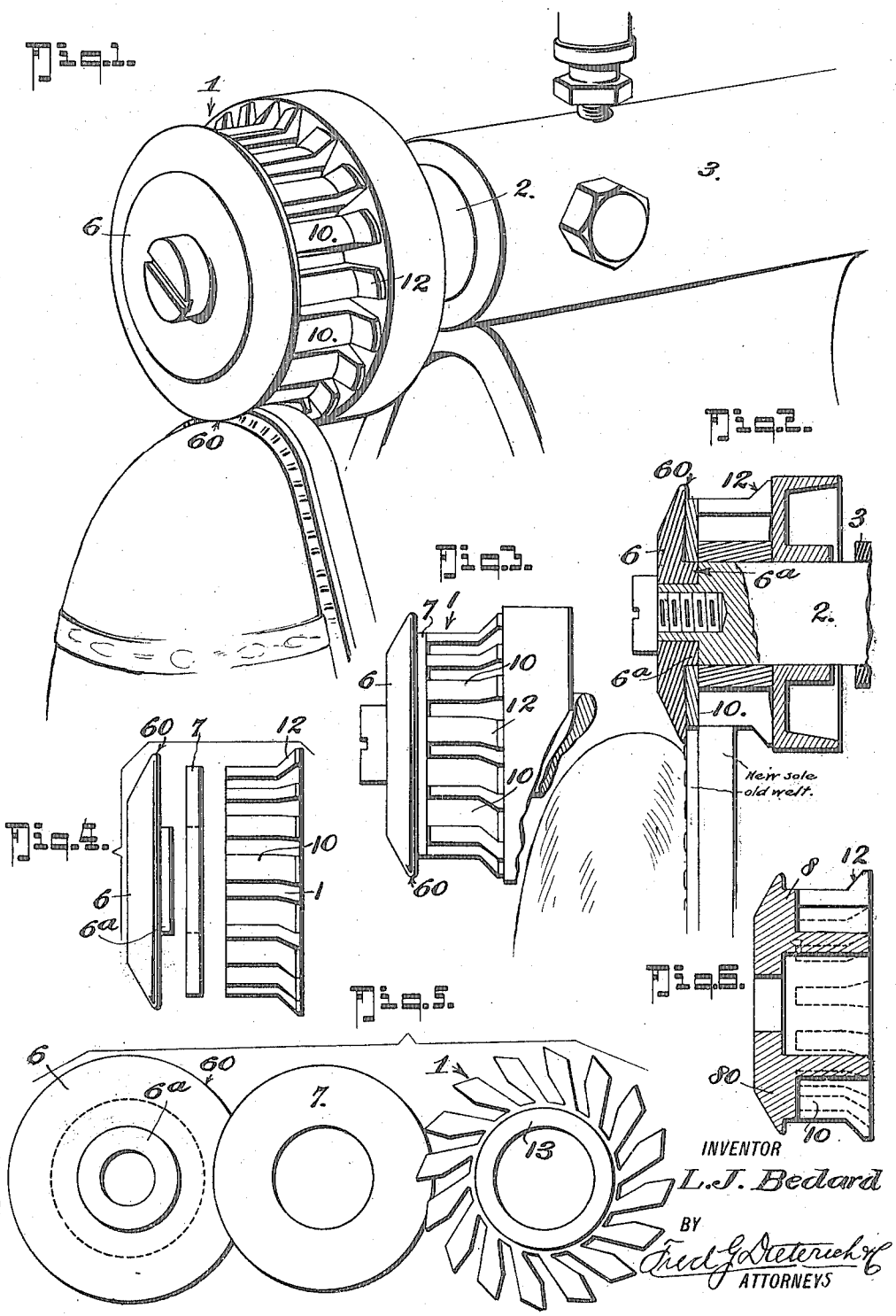

LUDGER J. BEDARD, OF MINNEAPOLIS, MINNESOTA.

EDGE-TRIMMING ROTARY CUTTER.

1,207,474.

Specification of Letters Patent.

Patented Dec. 5, 1916.

Application filed March 20, 1916. Serial No. 85,402.

*To all whom it may concern:*

Be it known that I, LUDGER J. BEDARD, residing at Minneapolis, in the county of Hennepin and State of Minnesota, have invented a new and Improved Edge-Trimming Rotary Cutter, of which the following is a specification.

This invention has reference to improvements in that type of appliances used on shoe machinery, in the nature of rotary cutters for trimming the edge of a shoe in factories.

As is well known to those skilled in the art, the sole and welt of a new shoe are trimmed to shape on a rough rounder, then stitched and trimmed close to the stitches with an edge trimming machine having a rotary cutter. Rotary cutters now usually employed, so far as I know, have their cutting edges extended across to both sides of the cutter, that is, the cutting face of the cutter is such that when the shoe is held up to the cutter to be trimmed, the cutting edge takes in the full width of the sole edge and the welt edge. Such construction of cutter works good on a new shoe when used by an experience operator, but when a shoemaker (repairer) attempts to use the said conventional type of rotary cutter, on a repaired shoe, he finds that it also trims the welt as the sole edge is being worked on and also cuts into the old stitches, thereby leaving a ragged edge.

My invention primarily has for its purpose to so improve the form of edge trimming cutter before referred to as to render it capable of being readily used by a shoe repairer, without danger of cutting the welt edge and the old stitches, it being understood that in repairing an old shoe, it is desirable to retain so much of the original shape as is possible.

My invention also has for its object to provide an improved construction of a rotary edge trimming cutter of a simple and inexpensive construction, in which is included provision by which, when using the cutter, makes it practically impossible to trim the sole smaller than the original shape, and which can be readily and practically used by an inexperienced man, thereby effecting a great advantage, since it requires, so far as I know, an experienced man to use any of the edge trimming machines now on the market.

With other objects in view that will hereinafter appear, my invention is an improved edge trimming rotary cutter that embodies the peculiar construction and novel arrangement of the parts hereinafter explained, specifically pointed out in the appended claims and illustrated in the accompanying drawings, in which:

Figure 1 is a perspective view of my improved edge trimming rotary cutter, and illustrates the manner in which it is operatively mounted. Fig. 2 is a cross section of my improved rotary cutter, the sole edge of the shoe being repaired, being shown as held up to the cutter, the relation of the welt to the protecting collar guide being also shown. Fig. 3 is a side elevation of my improved construction of rotary cutter. Fig. 4 is a similar view thereof the several parts being disconnected. Fig. 5 is a face view of the cutter member, the collar, and the guide members separated. Fig. 6 is a cross section of a slightly modified form of my improved cutter hereinafter described.

The rotary cutter, 1, which in its operative condition is mounted to turn with a driven shaft 2 of the shoe finishing machine 3, is formed with the usual tangentially directed cutting edges 10, and inclined cutters 12.

As before stated, in conventional forms of edge trimming rotary cutters, the cutting edges extend clear across and are of a width at least equal the combined width of the sole and welt edges, such shaping of the said cutting edges being necessary in trimming the welt and sole edges when finishing up new shoes.

My construction of rotary cutter differs from the conventional form of rotary edge trimmers for finishing new shoes, in that the cutting edges extend across the cutter body a distance only equal to the thickness of the sole edge to be trimmed, and also in forming the said cutter with a smooth or solid portion at the outer end of the cutter body, of a thickness equal that of the welt, and in terminating the said solid portion with an annular rim, which forms a guide adapted to ride over the top of the welt during the operation of trimming the sole edge and for holding the cutter in a true position for trimming the said sole edge only.

In the preferred construction of my device, as shown in Figs. 1, 2 and 3, the solid portion of the cutter that rides over the welt edge, when trimming the sole edge, consists of a flat disk collar 7 of the same diameter as the body of the cutter which is of a thickness equal that of the welt and which is held up solid against the outer face of the cutter body by another disk 6 with an axial opening to fit over the extended hub of the driven shaft 2 to which it is secured by a clamp screw, as is best shown in Fig. 3. By referring to Fig. 3, it will also be seen that the disk 6 has a hub 6ª upon which the collar 7 is fitted and the said disk is of sufficiently larger diameter than the collar to provide the annular guide rim or flange 60, as shown.

By reason of providing an annular guide rim in coöperative relation with the smooth portion formed by the periphery of the collar 7, no special skill is needed in holding the shoe sole to be trimmed up to the cutter, since the rim 60 forms a positive guide for properly holding the shoe sole edge to the cutter and thereby relieves the operator from gaging the position of the sole edge on the cutter by hand manipulation, while trimming, which is necessary in the use of the conventional type of rotary sole edge trimmers now in use.

The collar and the guide disk or shield are held up to the body of the cutter to rotate therewith by the usual clamp nut as shown in Fig. 1.

The advantages of my invention will be readily apparent when it is considered that there is a very small per cent., probably not one shoemaker in fifty that buys an old style trimmer who is able to successfully use it without considerable trial and experience, whereas with my construction of rotary cutter, the shoe maker can successfully use it at the start, since my cutter can be attached to any make of trimmer on the market and made ready for being practically manipulated by a shoe repairer.

Instead of forming the solid or smooth anuular surface on the rotary cutter that engages the welt edge during the operation of trimming the edge of a repaired shoe, by fitting a disk collar up against the outer end of the cutter body, the said body may be formed with an integral solid portion 8 that joins the individual cutter members as is shown in Fig. 6, and the said cutter may be further modified by forming the guide rim for riding between the welt and the shoe upper as an integral portion 80 of the said portion 8, as shown.

What I claim is:

1. In an edge trimming rotary cutter for trimming edges of soles, the combination of a rotary cutter body, a collar of approximately the same diameter as the cutting edges of the cutter body, at one end of the said cutter body, the edge of the said collar forming a smooth surface for engaging the edge of the welt and a shield of larger diameter than the cutter body and the collar, the said shield being adapted to act as a guide for riding on the upper face of the welt.

2. In an edge trimming rotary cutter for trimming edges of soles, a cutter body having a series of cutting edges that extend across the body a width at least equal the width of the edge of the sole to be trimmed and a solid annular portion that joins the said cutting edges, said portion being of the same diameter as the body of the cutter and forming a smooth surface for engaging the edge of the welt.

3. A rotary cutter for trimming sole edges, that comprises a body having an annular upwardly inclined guard at the inner end, a series of parallel cutting edges that extend through the said annular guard and across the body of the cutter, said cutter also including a smooth portion at the outer end of the cutter body, the said smooth portion being of the same diameter as that of the cutter body and adapted to form a smooth surface for engaging the welt edge as the cutting edges trim the sole edge, and an annular rim at the outer end of the said smooth portion adapted to act as a guide for riding on the top face of the welt and for holding the gutter to its sole edge trimming position.

4. As a new article; sole edge trimming rotary cutter for shoe repairing machines, comprising a body portion having a central bore and a series of independent cutting edges that extend from one end across the body portion, an annular smooth portion at said end, the other end of the body through which the cutting edges extend terminating in an upwardly inclined guard flange, said annular smooth portion being adapted to engage the shoe welt as the sole is being trimmed by the cutting edges and an annular rim flange portion normal to the smooth portion of the cutter that forms a guide to ride upon the upper face of the welt.

5. In a rotary cutter for trimming shoe sole edges, the combination of a driven shaft that includes an extended hub, a cutter body mounted on the shaft to turn therewith, said body having a series of cutter edges that extend entirely across it, a disk of greater diameter than the cutter body on the extended hub of the driven shaft and which forms an annular guide rim, the said disk having an axial hub extending from its inner face, a collar mounted on the said hub, said collar being of the same diameter as the cutter body, and forming a solid bearing portion to engage the edge of the welt when the cutter trims the sole edge, the said guide rim being arranged to ride on the top face of the welt, and means for causing the said disk and collar to turn the cutter.

LUDGER J. BEDARD.